(12) United States Patent
Chou et al.

(10) Patent No.: US 11,940,854 B2
(45) Date of Patent: Mar. 26, 2024

(54) REPLACEMENT DEVICE AND ELECTRONIC DEVICE

(71) Applicant: GETAC TECHNOLOGY CORPORATION, New Taipei (TW)

(72) Inventors: Hsin-Chih Chou, Taipei (TW); Wan-Lin Hsu, Taipei (TW); Juei-Chi Chang, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 17/981,327

(22) Filed: Nov. 4, 2022

(65) Prior Publication Data
US 2023/0259180 A1 Aug. 17, 2023

Related U.S. Application Data

(60) Provisional application No. 63/309,463, filed on Feb. 11, 2022.

(30) Foreign Application Priority Data

Sep. 16, 2022 (CN) .......................... 202211129329.9

(51) Int. Cl.
*G06F 1/18* (2006.01)
*G06F 1/16* (2006.01)
(52) U.S. Cl.
CPC ............ *G06F 1/186* (2013.01); *G06F 1/1635* (2013.01); *G06F 1/187* (2013.01)

(58) Field of Classification Search
CPC ...... G06F 1/1635; G06F 1/1679; G06F 1/186; G06F 1/187
See application file for complete search history.

(56) References Cited

U.S. PATENT DOCUMENTS

| 5,305,180 A * | 4/1994 | Mitchell ............... G06F 1/1656 361/728 |
| 5,432,673 A * | 7/1995 | Ogami .................. G06F 1/1656 439/159 |
| 9,535,459 B2 * | 1/2017 | Lee ........................ G06F 1/1635 |
| 11,474,566 B2 * | 10/2022 | Chang ................... G06F 1/1679 |

(Continued)

FOREIGN PATENT DOCUMENTS

| CN | 104066298 B | 2/2017 |
| EP | 3764760 A1 | 1/2021 |

(Continued)

*Primary Examiner* — Adrian S Wilson
(74) *Attorney, Agent, or Firm* — Cooper Legal Group, LLC

(57) ABSTRACT

A replacement device includes a replacement module and a slider. The replacement module includes a sliding portion. The sliding portion is provided with a limiting column, which is formed with a fixing hole. The slider includes a slider body. The slider body is provided with a first latch, a limiting hole and a fixing element, wherein the first latch is arranged on a first side edge of the slider body. The slider is correspondingly arranged on the sliding portion of the replacement module, and the limiting column of the sliding portion passes through the limiting hole. The fixing element has a top portion, and is fixed in the fixing hole. The size of the top portion is greater than the size of the limiting hole, so that the slider moves relative to the replacement module within a limit range of the limiting hole.

20 Claims, 6 Drawing Sheets

(56) References Cited

U.S. PATENT DOCUMENTS

| | | |
|---|---|---|
| 2009/0168331 A1 | 7/2009 | Fujiwara |
| 2011/0222237 A1 | 9/2011 | Fujiwara et al. |
| 2014/0078679 A1 | 3/2014 | Tsunoda et al. |
| 2021/0278880 A1* | 9/2021 | Chang .................. G06F 1/1679 |
| 2023/0038904 A1* | 2/2023 | Hsu ..................... H05K 5/0221 |

FOREIGN PATENT DOCUMENTS

| | | |
|---|---|---|
| EP | 3876075 A1 | 9/2021 |
| TW | 233051 | 10/1994 |

\* cited by examiner

REPLACEMENT DEVICE AND ELECTRONIC DEVICE

The application claims the benefit of a U.S. Provisional Patent Application No. 63/309,463, filed on Feb. 11, 2022, the disclosure of which is hereby incorporated by reference herein in its entirety. The application further claims priority to a CN Patent Application No. 202211129329.9, filed on Sep. 16, 2022, the disclosure of which is also hereby incorporated by reference herein in its entirety.

BACKGROUND OF THE INVENTION

Field of the Invention

The present application relates to replacement devices and, more particularly, to a replacement device with a slider, and an electronic device having the replacement device.

Description of the Prior Art

An electronic device such as a common laptop computer or tablet computer is usually flat in shape, and a replaceable replacement module is often provided on the electronic device. Usually, the replacement module may be a battery, a hard disk drive (HDD) or other functional modules. The replacement module is usually flat in shape, and is commonly installed in two ways—being embedded at a bottom surface of the electronic device as one, and inserted into the electronic device through an opening on the side of the electronic device as the other.

However, due to inadequate securing structures of the replacement module arranged on the electronic device, the replacement module may become separated from the electronic device when the electronic device is dropped.

SUMMARY OF THE INVENTION

In view of the above, a replacement device provided according to an embodiment includes a replacement module and a slider. The replacement module includes a sliding portion. The sliding portion is provided with a limiting column, which is formed with a fixing hole. The slider includes a slider body. The slider body is provided with a first latch, a limiting hole and a fixing element, wherein the first latch is arranged on a first side edge of the slider body. The slider is correspondingly arranged on the sliding portion of the replacement module, and the limiting column of the sliding portion passes through the limiting hole. The fixing element has a top portion, and is fixed in the fixing hole. The size of the top portion is greater than the size of the limiting hole, so that the slider moves relative to the replacement module within a limit range of the limiting hole.

In some embodiments, the limiting hole has an inner lip portion. The inner lip portion is located on an inner edge of the limiting hole, and the top portion abuts against the inner lip portion.

In some embodiments, the slider body further includes a first slide track.

In some embodiments, the sliding portion further includes a second slide track, which is connected to the first slide track.

In some embodiments, the second slide track of each sliding portion defines a movement range, and the corresponding first slide track is adapted to slide within the movement range.

In some embodiments, the slider body further includes a toggle rod, which protrudes from the slider body toward a direction away from the replacement module.

In some embodiments, the replacement module further includes a positioning column, which is located on one end of the replacement module. The slider body further includes a positioning notch, and the positioning column corresponds to and is accommodated in the positioning notch.

In some embodiments, the slider body has an opening portion, which is provided with a tie strap.

In some embodiments, the slider body has a first positioning recessed section and a second positioning recessed section, which are provided on one side of the slider body facing the replacement module. The replacement module has a protrusion. When the slider moves relative to the replacement module, the protrusion is selectively accommodated in the first positioning recessed section or the second positioning recessed section.

In some embodiments, the slider body further includes a second latch, which is provided on a second side edge perpendicular to the first side edge where the first latch is located.

A replacement device provided according to an embodiment includes a replacement module and two sliders. The replacement module includes two sliding portions, which are respectively located on two opposites sides. Each of the sliding portions is provided with a limiting column, which is formed with a fixing hole. Each slider includes a slider body. Each slider body is provided with a first latch, a limiting hole and a fixing element, wherein the first latch is arranged on a first side edge of the slider body. The two sliders are correspondingly arranged on the two sliding portions of the replacement module, respectively, and the limiting column of each of the sliding portions passes through the corresponding limiting hole. The fixing element has a top portion, and is fixed in the corresponding fixing hole. The size of the top portion is greater than the size of the limiting hole, so that each slider moves relative to the replacement module within a limit range of the corresponding limiting hole.

An electronic device provided according to an embodiment includes a casing and a replacement device. The casing includes an installation chamber and a first latch slot. The replacement device is accommodated in the installation chamber. The replacement device includes a replacement module and a slider. The replacement module includes a sliding portion. The sliding portion is provided with a limiting column, which is formed with a fixing hole. The slider includes a slider body. The slider body is provided with a first latch, a limiting hole and a fixing element, wherein the first latch is arranged on a first side edge of the slider body. The slider is correspondingly arranged on the sliding portion of the replacement module, and the limiting column of the sliding portion passes through the limiting hole. The fixing element has a top portion, and is fixed in the fixing hole. The size of the top portion is greater than the size of the limiting hole, so that the slider moves relative to the replacement module within a limit range of the limiting hole, and the first latch is selectively accommodated in the first latch slot.

In conclusion, the replacement device provided according to the above embodiments is suitable for use with an electronic device. When the replacement module is accommodated in the installation chamber of the electronic device, by accommodating the latch on the slider in the latch slot of the electronic device, the replacement device can be fixed on the electronic device. To detach the replacement device from the electronic device, the latch is removed from the latch slot, and the replacement device can then be taken out. Thus, the replacement device can be effectively fixed and thus prevented from being separated from the electronic device, and the replacement device can also be quickly and conveniently removed when such removal is desired.

DETAILED DESCRIPTION OF THE EMBODIMENTS

Figure 1:
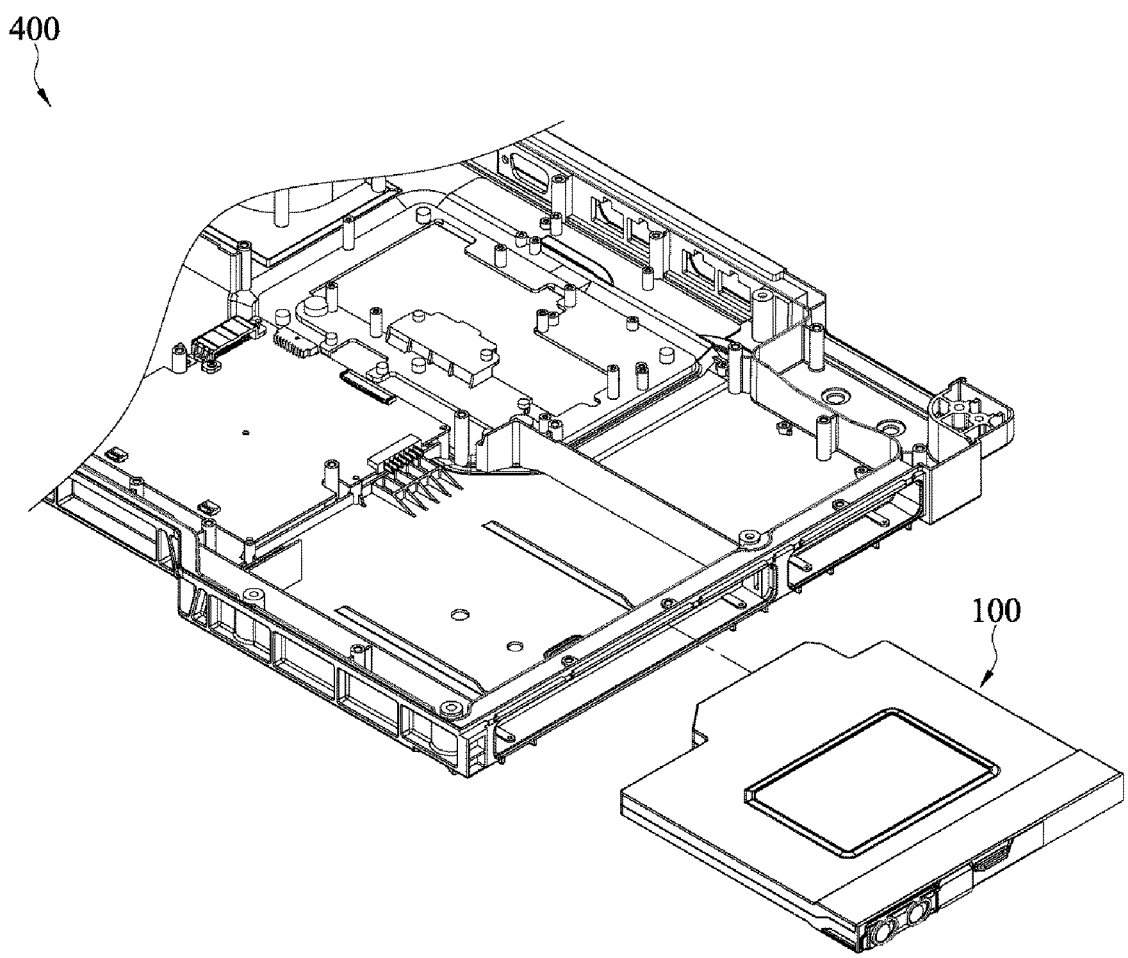
FIG. 1 is an exploded diagram of an electronic device according to a first embodiment.
Figure 2:
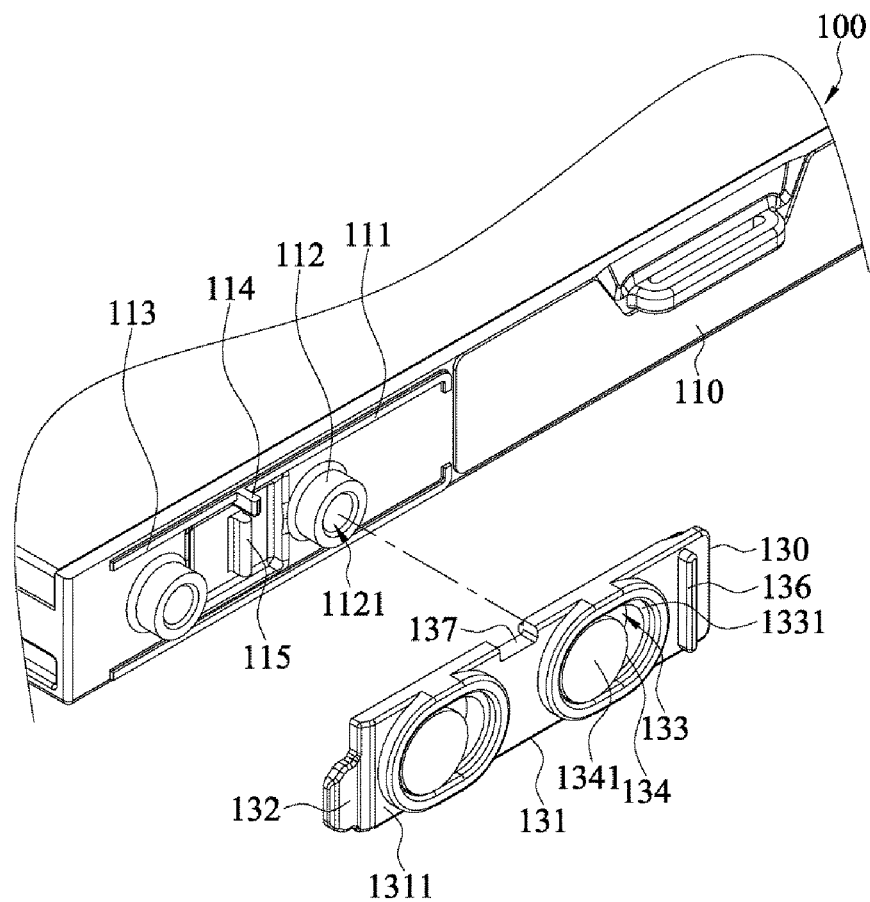
FIG. 2 is an exploded diagram of the electronic device according to the first embodiment.
Figure 3:
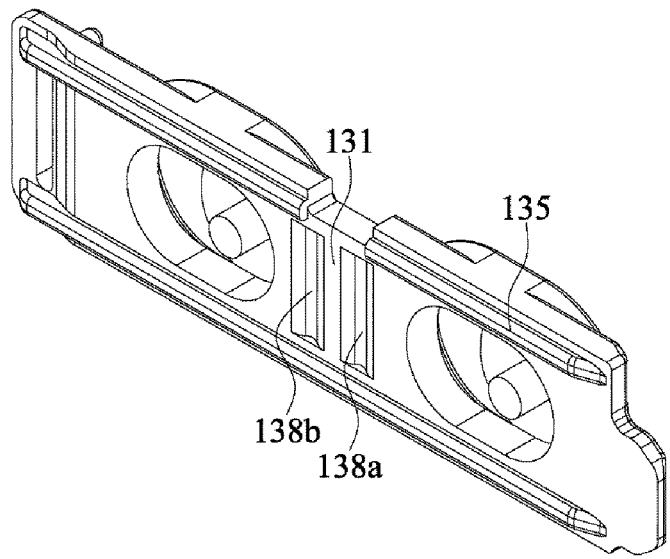
FIG. 3 is a perspective diagram of a slider according to the first embodiment.
Figure 4:
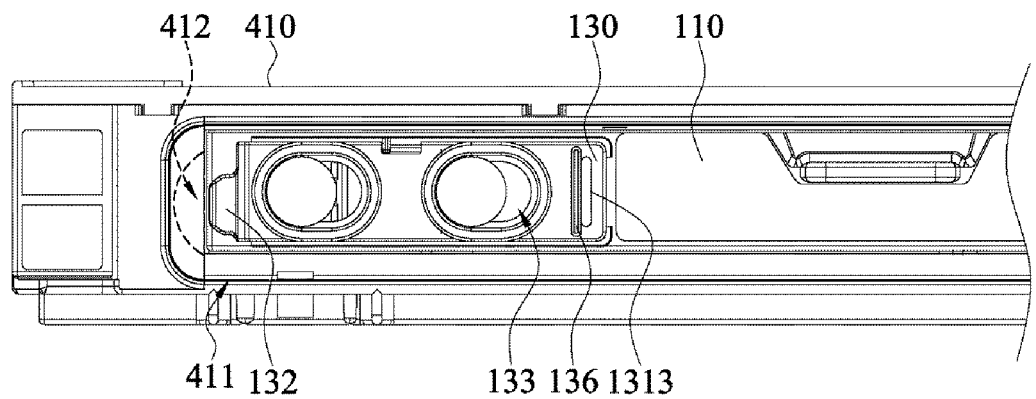
FIG. 4 is a first front view of the electronic device according to the first embodiment.
Figure 5:
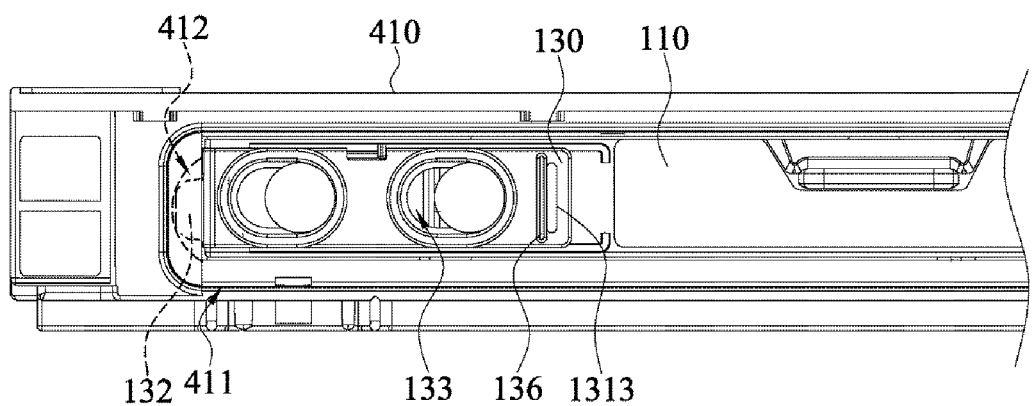
FIG. 5 is a second front view of the electronic device according to the first embodiment.

Refer to FIG. 1 to FIG. 5. FIG. 1 shows an exploded diagram of an electronic device according to a first embodiment. FIG. 2 shows an exploded diagram of the electronic device according to the first embodiment. FIG. 3 shows a perspective diagram of a slider according to the first embodiment. FIG. 4 shows a first front view of the electronic device according to the first embodiment. FIG. 5 shows a second front view of the electronic device according to the first embodiment. As shown in FIG. 1, a replacement device 100 is suitable for use with an electronic device 400. The replacement device 100 is, for example, a battery device, a HDD device or an optical drive device. The electronic device 400 is, for example, a laptop computer, a tablet computer or an expansion device. As shown in FIG. 2, the replacement device 100 includes a replacement module 110 and a slider 130. The replacement module 100 includes a sliding portion 111. The sliding portion 111 is provided with a limiting column 112, which is formed with a fixing hole 1121. In the first embodiment, the limiting column 112 is, for example but not limited to, two in quantity. Since the limiting columns 112 are identically structured, only one of the limiting columns 112 is described in detail below.

As shown in FIG. 2, the slider 130 includes a slider body 131. The slider body 131 is provided with a first latch 132, a limiting hole 133 and a fixing element 134, wherein the first latch 132 is arranged on a first side edge 1311 of the slider body 131. In the first embodiment, each of the limiting hole 133 and the fixing element 134 is provided in a quantity corresponding to that of the limiting column 112. As shown in FIG. 2, each of the limiting hole 133 and the fixing element 134 is, for example but not limited to, two in quantity. Since the limiting holes 133 or the fixing elements134 are identically structured, only one of the limiting holes 133 and one of the fixing elements 134 are described in detail below.

As shown in FIG. 2, the slider 130 is correspondingly arranged on the sliding portion 111 of the replacement module 110, and the limiting column 112 of the sliding portion 111 passes through the limiting hole 133. The fixing element 134 has a top portion 1341, and is fixed in the fixing hole 1121. The size of the top portion 1341 is greater than the size of the limiting hole 133, so that the slider 130 moves relative to the replacement module 110 within a limit range of the limiting hole 133. In the first embodiment, the size of the top portion 1341 is greater than the size of the limiting hole 133, so that the slider 130 is sandwiched between the sliding portion 111 and the fixing element 134. In the first embodiment, the slider 130 moves with the limitations of the limiting hole 133 and the limiting column 112. Because the limiting column 112 passes through the limiting hole 133, a hole wall of the limiting hole 133 abuts against the limiting column 112 so as to achieve a limiting function when the slider 130 moves relative to the replacement module 110.

As shown in FIG. 1, FIG. 4 and FIG. 5, in the first embodiment, the electronic device 400 includes a casing 410. The casing 410 includes an installation chamber 411 and a first latch slot 412. The replacement device 100 is accommodated in the installation chamber 411. The slider 130 is movable relative to the replacement module 110 within the limit range of the limiting hole 133, so that the first latch 132 is selectively accommodated in the first latch slot 412, thereby preventing the replacement device 100 installed in the installation chamber 411 from falling off. The installation chamber 411 may be covered by a door cover (not shown) thereon to close the installation chamber 411.

More specifically, when the replacement device 100 is accommodated in the installation chamber 411 of the electronic device 400, by accommodating the first latch 132 on the slider 130 in the first latch slot 412 of the electronic device 400, the replacement device 100 can be fixed on the electronic device 400. To detach the replacement device 100 from the electronic device 400, the first latch 132 is removed from the first latch slot 412, and the replacement device 100 can then be taken out. Thus, the replacement device 100 can be effectively fixed and thus prevented from being separated from the electronic device 400, and the replacement device 100 can also be quickly and conveniently removed when such removal is desired.

As shown in FIG. 2, in the first embodiment, the limiting hole 133 has an inner lip portion 1331. The inner lip portion 1331 is located on an inner edge of the limiting hole 133, and the top portion 1341 abuts against the inner lip portion 1331. When the slider 130 moves relative to the replacement module 110, the inner lip portion 1331 slides tightly against the top portion 1341.

As shown in FIG. 2 and FIG. 3, in the first embodiment, the slider body 131 further includes a first slide track 135. The sliding portion 111 further includes a second slide track 113, which is connected to the first slide track 135. By connecting the second slide track 113 to the first slide track 135, a movement direction of the slider 130 is guided. In the first embodiment, the second slide track 113 defines a movement range, and the corresponding first slide track 135 is allowed to slide within the movement range.

As shown in FIG. 2, in the first embodiment, the slider body 131 further includes a toggle rod 136, which protrudes from the slider body 131 in a direction away from the replacement module 110. A user is allowed to easily push the toggle rod 136 protruding from the slider body 131 to operate the slider 130 to move relative to the replacement module 110.

As shown in FIG. 2, the replacement module 110 further includes a positioning column 114, which is located on one side of the replacement module 110. The slider body 130 further includes a positioning notch 137, and the positioning column 114 corresponds to and is accommodated in the positioning notch 137. With the fitting of the positioning column 114 and the positioning notch 137, a user is allowed to intuitively arrange the slider 130 on the replacement module 110 when such arrangement is desired. Moreover, the positioning column 114 and the positioning notch 137 can also achieve a limiting function. As shown in FIG. 2, the positioning notch 137 has a predetermined space, and when the slider 130 moves relative to the replacement module 110, a sidewall of the positioning notch 137 abuts against the positioning column 114 so as to achieve a limiting function. In another embodiment, the positioning notch 137 is located at the replacement module 110, and the positioning column 114 is located at the slider body 131, similarly achieving the foregoing function and effect.

As shown in FIG. 4 and FIG. 5, in the first embodiment, the slider body 131 has an opening portion 1313, which is provided with a tie strap. To take out the replacement device 100 from the installation chamber 411 of the electronic device 400, the replacement device 100 can be more easily taken out by pulling the tie strap. In another embodiment, the opening portion 1313 is provided on the toggle rod 136.

Referring to FIG. 2 and FIG. 3 as well as FIG. 4 and FIG. 5, the slider body 131 has a first positioning recessed section 138a and a second positioning recessed section 138b, which are provided on one side of the slider body 131 facing the replacement module 110. The replacement module 110 has a protrusion 115. When the slider 130 moves relative to the replacement module 110, the protrusion 115 is selectively accommodated in the first positioning recessed section 138a or the second positioning recessed section 138b. As shown in FIG. 4, when the first latch 132 is not accommodated in the first latch slot 412, the protrusion 115 is located in the first positioning recessed section 138a. As shown in FIG. 5, when the first latch 132 is accommodated in the first latch slot 412, the protrusion 115 is located in the second positioning recessed section 138b. Thus, to move the slider 130 relative to the replacement module 110, a user needs to apply a certain force to move the slider 130, and so the slider 130 is prevented from sliding and hence from causing the first latch 132 to separate from the first latch slot 412. Moreover, by selectively accommodating the protrusion 115 in the first positioning recessed section 138a or the second positioning recessed section 138b, a user is also allowed to feel sliding of the slider 130 while operating the slider 130. In another embodiment, the first positioning recessed section 138a and the second positioning recessed section 138b are located at the replacement module 110, and the protrusion 115 is located at the slider body 131, similarly achieving the foregoing function and effect.

Figure 6:
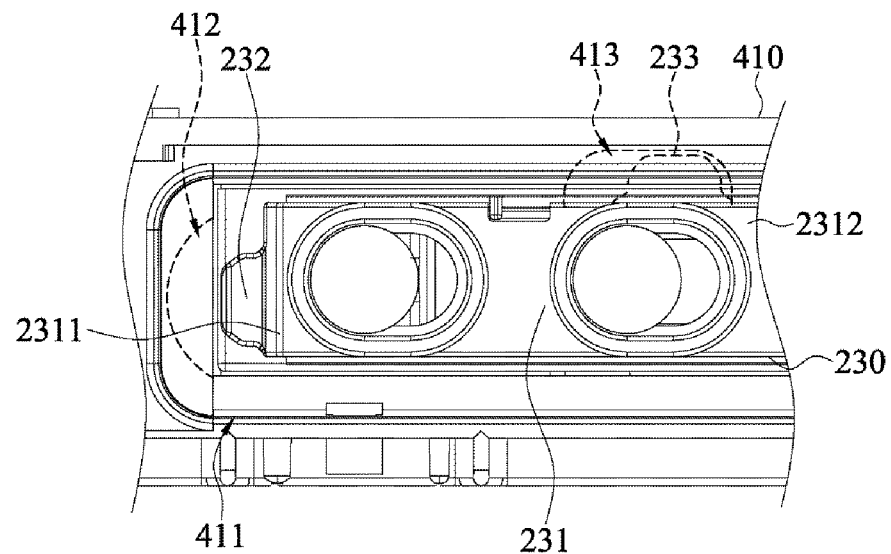
FIG. 6 is a front view of an electronic device according to a second embodiment.

Refer to FIG. 6. FIG. 6 shows a front view of an electronic device according to a second embodiment. Details of structures of the second embodiment similar to those of the first embodiment are omitted herein for brevity. In the second embodiment, a slider body 231 of a slider 230 further includes a second latch 233, which is provided on a second side edge 2312 perpendicular to a first side edge 2311 where a first latch 232 is located. Moreover, the casing 410 also has a second latch slot 413 that correspondingly accommodates the second latch 233. As such, said latches enable the slider 230 to be securely accommodated in the installation chamber 411.

Figure 7:
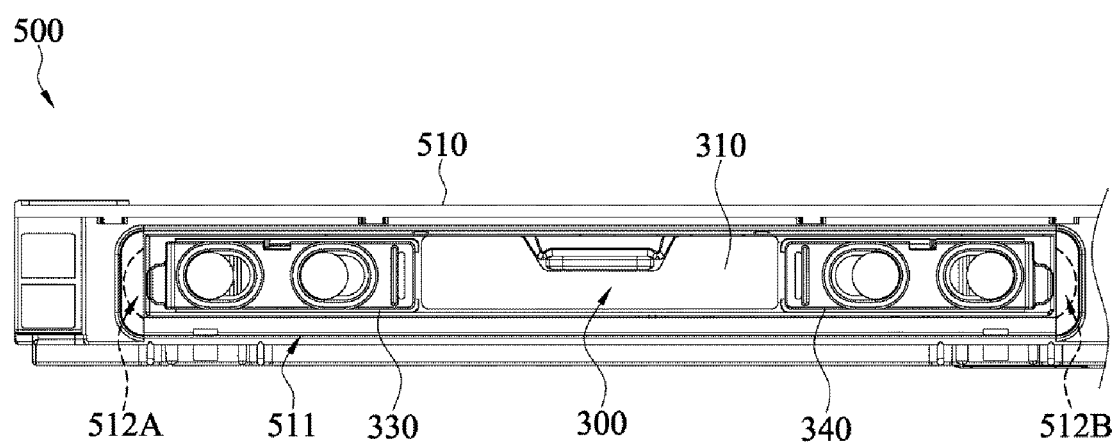
FIG. 7 is a front view of an electronic device according to a third embodiment.
Figure 8:
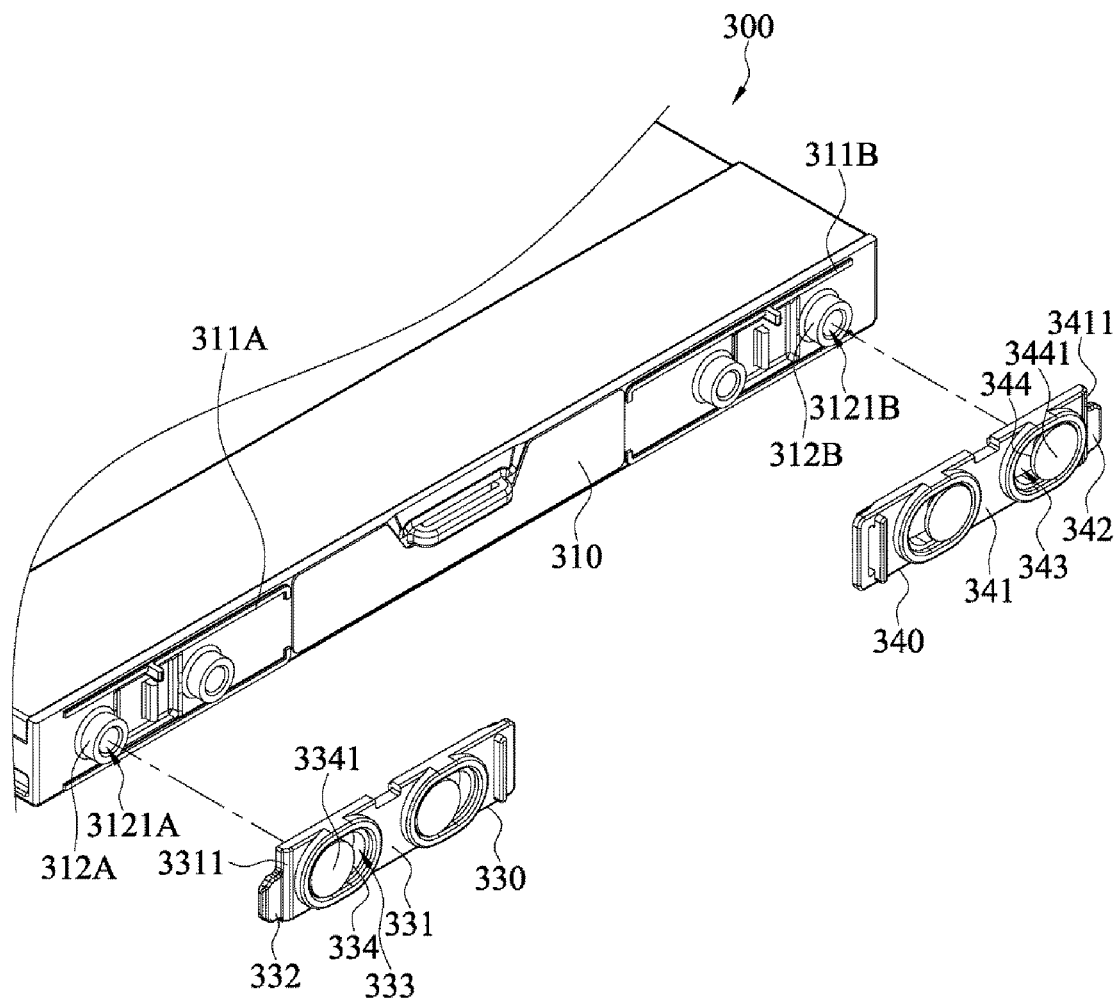
FIG. 8 is an exploded diagram of the electronic device according to the third embodiment.

Refer to FIG. 7 to FIG. 8. FIG. 7 shows a front view of an electronic device according to a third embodiment. FIG. 8 shows an exploded diagram of the electronic device according to the third embodiment. Details of structures of the third embodiment similar to those of the first embodiment are omitted herein. In the third embodiment, a replacement device 300 includes a replacement module 310 and two sliders 330 and 340. In the third embodiment, the sliders 330 and 340 each are two in quantity, and are identically structured. In the description below, the two sliders are referred to as a first slider 330 and a second slider 340 for illustrations.

As shown in FIG. 8, the replacement module 310 includes two sliding portions 311A and 311B. To correspond to the first slider 330 and the second slider 340, the sliding portions 311A and 311B each are also two in quantity and are identically structured. In the description below, the two sliding portions are referred to as a first sliding portion 311A and a second sliding portion 311B for illustrations.

The first sliding portion 311A and the second sliding portion 311B are respectively located on two opposites sides. The first sliding portion 311A is provided with a limiting column 312A, which is formed with a fixing hole 3121A. The second sliding portion 311B is provided with a limiting column 312B, which is formed with a fixing hole 3121B. The first slider 330 includes a slider body 331. The slider body 331 is provided with a first latch 332, a limiting hole 333 and a fixing element 334, wherein the first latch 332 is arranged on a first side edge 3311 of the slider body 331. The second slider 340 includes a slider body 341. The slider body 341 is provided with a first latch 342, a limiting hole 343 and a fixing element 344, wherein the first latch 342 is arranged on a first side edge 3411 of the slider body 341. The first slider 330 and the second slider 340 are correspondingly arranged at the first sliding portion 311A and the second sliding portion 311B of the replacement module 310, respectively, and the limiting columns 312A and 312B of the first sliding portion 311A and the second sliding portion 311B pass through the corresponding limiting holes 333 and 343, respectively. The two fixing elements 334 and 344 have top portions 3341 and 3441, and the two fixing elements 334 and 344 are fixed in the corresponding fixing holes 3121A and 3121B, respectively. The sizes of the top portions 3341 and 3441 are greater than the sizes of the corresponding limiting holes 333 and 343, so that the first slider 330 and the second slider 340 move relative to the replacement module 310 within limit ranges of the corresponding limiting holes 333 and 343, respectively. As such, with said sliders, a fixing relationship between the replacement device 300 and an electronic device 500 is reinforced, preventing the replacement device 300 from being detached due to falling of the electronic device 500.

Figure 9:
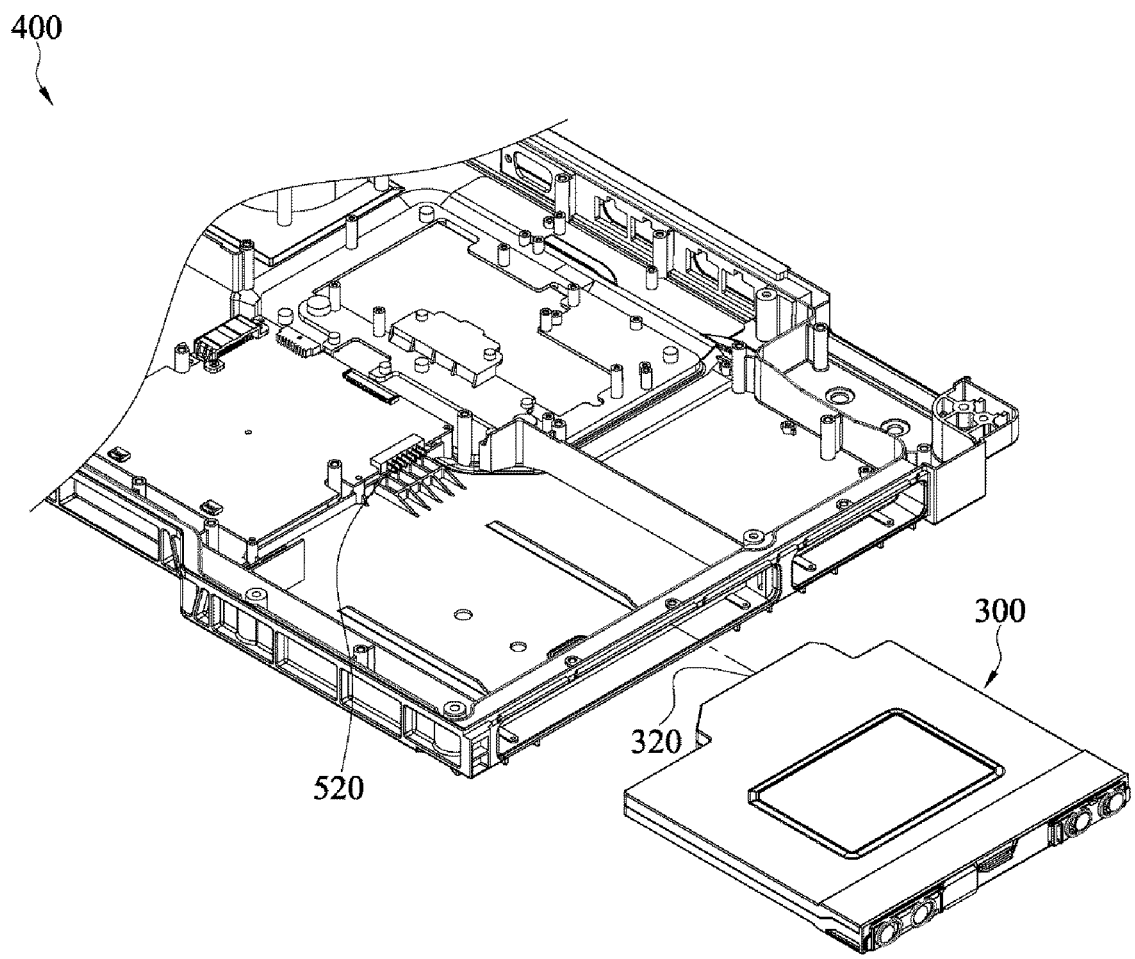
FIG. 9 is an exploded diagram of the electronic device according to the third embodiment.

As shown in FIG. 7, in the third embodiment, the electronic device 500 includes a casing 510. The casing 510 includes an installation chamber 511 and first latch slots 512A and 512B. The replacement device 300 is accommodated in the installation chamber 511. The first slider 330 and the second slider 340 are movable relative to the replacement module 310 within the limit ranges of the limiting holes 333 and 343, so that the first latches 332 and 342 are selectively accommodated in the first latch slots 512A and 512B, respectively. As shown in FIGS. 7 to 9, the replacement device 300 further has a first connector 320, and the electronic device 500 further has a second connector 520 corresponding to the first connector 320. The first connector 320 is away from the first slider 330/the first sliding portion 311A and the second slider 340/the second sliding portion 311B. To install the replacement device 300 in the installation chamber 511 of the electronic device 500, the first connector 320 is electrically connected to the second connector 520, and the first latch 332 of the first slider 330 and the first latch 342 of the second slider 340 are respectively accommodated in the first latch slots 512A and 512B on the two opposite sides. As such, securing effects in three directions are achieved, and the fixing relationship between the replacement device 300 and the electronic device 500 is reinforced, preventing the replacement device 300 from being detached due to falling of the electronic device 500.

In conclusion, the replacement device provided according to the above embodiments is suitable for use with an electronic device. When the replacement device is accommodated in the installation chamber of the electronic device, by accommodating the first latch on the slider in the first latch slot of the electronic device, the replacement device can be fixed on the electronic device. To detach the replacement device from the electronic device, the first latch is removed from the first latch slot, and the replacement device can then be taken out. Thus, the replacement device can be effectively fixed and thus prevented from being separated from the electronic device, and the replacement device can also be quickly and conveniently removed when such removal is desired. Moreover, by increasing the number of latches or the number of sliders, the fixing relationship between the replacement device and the electronic device can be reinforced.

The technical contents of the present invention are disclosed by way of the preferred embodiments above. However, these embodiments are not to be construed as limitations to the present invention. Slight modifications and variations made to the embodiments by a person skilled in the art without departing from the spirit and scope of the present invention are encompassed within the scope of the present invention. Therefore, the scope of legal protection of the present invention shall be defined by the appended claims.

What is claimed is:

1. A replacement device, comprising:
a replacement module, comprising a sliding portion, the sliding portion provided with at least one limiting column formed with a fixing hole; and
a slider, comprising a slider body, the slider body provided with a first latch, at least one limiting hole and at least one fixing element, wherein the first latch is arranged on a first side edge of the slider body;
wherein the slider is correspondingly arranged on the sliding portion of the replacement module, the at least one limiting column of the sliding portion passes through the least one limiting hole, the at least one fixing element has a top portion and is fixed in the fixing hole, and a size of the top portion is greater than a size of the limiting hole, so that the slider moves relative to the replacement module within a limit range of the at least one limiting hole.

2. The replacement device according to claim 1, wherein the at least one limiting hole has an inner lip portion, the inner lip portion is located on an inner edge of the at least one limiting hole, and the top portion abuts against the inner lip portion.

3. The replacement device according to claim 1, wherein the slider body further comprises a first slide track.

4. The replacement device according to claim 3, wherein the sliding portion further comprises a second slide track, which is connected to the first slide track.

5. The replacement device according to claim 1, wherein the slider body further comprises a toggle rod, which protrudes from the slider body toward a direction away from the replacement module.

6. The replacement device according to claim 1, wherein the replacement module further comprises a positioning column, which is located on one side of the replacement module, the slider body further comprises a positioning notch, and the positioning column corresponds to and is accommodated in the positioning notch.

7. The replacement device according to claim 1, wherein the slider body comprises an opening portion, which is provided with a tie strap.

8. The replacement device according to claim 1, wherein the slider body has a first positioning recessed section and a second positioning recessed section, the first positioning recessed section and the second positioning recessed section are provided on one side of the slider body facing the replacement module, the replacement module has a protrusion, and when the slider moves relative to the replacement module, the protrusion is selectively accommodated in the first positioning recessed section or the second positioning recessed section.

9. The replacement device according to claim 1, wherein the slider body further comprises a second latch, which is provided on a second side edge perpendicular to the first side edge where the first latch is located.

10. A replacement device, comprising:
a replacement module, comprising two sliding portions respectively located on two opposites sides, each of the sliding portions provided with at least one limiting column formed with a fixing hole; and
two sliders, each of the sliders comprising a slider body, each slider body provided with a first latch, at least one limiting hole and at least one fixing element, wherein the first latch is arranged on a first side edge of the slider body;
wherein the two sliders are correspondingly arranged on the two sliding portions of the replacement module, respectively, the at least one limiting column of each sliding portion passes through the corresponding least one limiting hole, the at least one fixing element has a top portion and is fixed in the fixing hole, and a size of the top portion is greater than a size of the limiting hole, so that each slider moves relative to the replacement module within a limit range of the corresponding at least one limiting hole.

11. The replacement device according to claim 10, wherein the at least one limiting hole has an inner lip portion, the inner lip portion is located on an inner edge of the at least one limiting hole, and the top portion abuts against the inner lip portion.

12. The replacement device according to claim 10, wherein each of the slider bodies further comprises a first slide track, and each of the sliding portions further comprises a second slide track, which is connected to the corresponding first slide track.

13. The replacement device according to claim 12, wherein the second slide track of each of the sliding portions defines a movement range, and the corresponding first slide track is adapted to slide within the movement range.

14. The replacement device according to claim 10, wherein each of the slider body further comprises a toggle rod, which protrudes from the slider body toward a direction away from the replacement module.

15. The replacement device according to claim 10, wherein the replacement module further comprises a positioning column, which is located on one end of the replacement module, one of the two slider bodies further comprises a positioning notch, and the positioning column corresponds to and is accommodated in the positioning notch.

16. The replacement device according to claim 10, wherein each of the slider bodies has a first positioning recessed section and a second positioning recessed section, the first positioning recessed section and the second positioning recessed section are provided on one side of the slider body facing the replacement module, the replacement module has two protrusions, and when each of the sliders moves relative to the replacement module, each of the protrusions is selectively accommodated in the corresponding first positioning recessed section or the corresponding second positioning recessed section.

17. An electronic device, comprising:
   a casing, comprising an installation chamber and a first latch slot; and
   a replacement device, accommodated in the installation chamber, the replacement device comprising:
      a replacement module, comprising at least one sliding portion, the at least one sliding portion provided with at least one limiting column formed with a fixing hole; and
      at least one slider, comprising a slider body, the slider body provided with a first latch, at least one limiting hole and at least one fixing element, wherein the first latch is arranged on a first side edge of the slider body;
      wherein the at least one slider is correspondingly arranged on the at least one sliding portion of the replacement module, the at least one limiting column of the sliding portion passes through the least one limiting hole, the at least one fixing element has a top portion and is fixed in the fixing hole, and a size of the top portion is greater than a size of the limiting hole, so that the slider moves relative to the replacement module within a limit range of the at least one limiting hole, and the first latch is selectively accommodated in the first latch slot.

18. The electronic device according to claim 17, wherein the at least one sliding portion of the replacement module is two sliding portions respectively provided on two opposite sides, and the at least one slider is two sliders respectively corresponding to the two sliding portions.

19. The electronic device according to claim 17, wherein the slider body further comprises a second latch, which is provided on a second side edge perpendicular to the first side edge where the first latch is located, the casing comprises a second latch slot, and the at least one slider moves relative to the replacement module within a limit range of the at least one limiting hole, so that the second latch is selectively accommodated in the second latch slot.

20. The electronic device according to claim 17, wherein the slider body has a first positioning recessed section and a second positioning recessed section, the first positioning recessed section and the second positioning recessed section are provided on one side of the slider body facing the replacement module, the slider body has a protrusion, and when the at least one slider moves relative to the replacement module, the protrusion is selectively accommodated in the first positioning recessed section or the second positioning recessed section.

\* \* \* \* \*